United States Patent [19]

Osterling

[11] Patent Number: 4,998,948
[45] Date of Patent: Mar. 12, 1991

[54] LAWN MOWER
[75] Inventor: Lloyd A. Osterling, Bradenton, Fla.
[73] Assignee: Scag Power Equipment, Inc., Mayville, Wis.
[21] Appl. No.: 445,976
[22] Filed: Dec. 4, 1989
[51] Int. Cl.⁵ ............................................ A01D 34/68
[52] U.S. Cl. ..................... 56/12.6; 56/16.7; 56/DIG. 9; 56/DIG. 10; 280/32.7
[58] Field of Search ............... 56/16.7, 1, 2, 12.6, 56/16.9, 17.5, DIG. 3, DIG. 9, DIG. 10, DIG. 11, DIG. 14; 180/215; 280/460.1, 32.7

[56] References Cited

U.S. PATENT DOCUMENTS

| | | | |
|---|---|---|---|
| 2,710,514 | 6/1955 | Broussard | 56/25.4 |
| 2,919,756 | 1/1960 | Knipe | 280/32.7 |
| 3,056,458 | 10/1962 | Gray | 172/448 |
| 3,267,651 | 8/1966 | Engler | 56/6 |
| 3,295,866 | 1/1967 | Standfuss | 280/460.1 |
| 4,413,692 | 11/1983 | Clifft | 180/11 |
| 4,760,686 | 8/1988 | Samejima et al. | 56/15.9 |

FOREIGN PATENT DOCUMENTS 1009873A 4/1983 U.S.S.R. .
1279900A 12/1986 U.S.S.R. .

Primary Examiner—Ramon S. Britts
Assistant Examiner—Terry Lee Melius
Attorney, Agent, or Firm—Michael, Best & Friedrich

[57] ABSTRACT

A lawn mower comprises a riding and a steering frame pivotally connected to an engine and cutter assembly which includes an engine and transmission mounted on an engine deck and cutter blades driven by the engine and mounted below the cutter deck. The steering frame is pivotally attached to the engine deck and supports a rider seat and a steering assembly. A shock absorber extends between the pivotally connected engine and riding and steering frame.

15 Claims, 1 Drawing Sheet

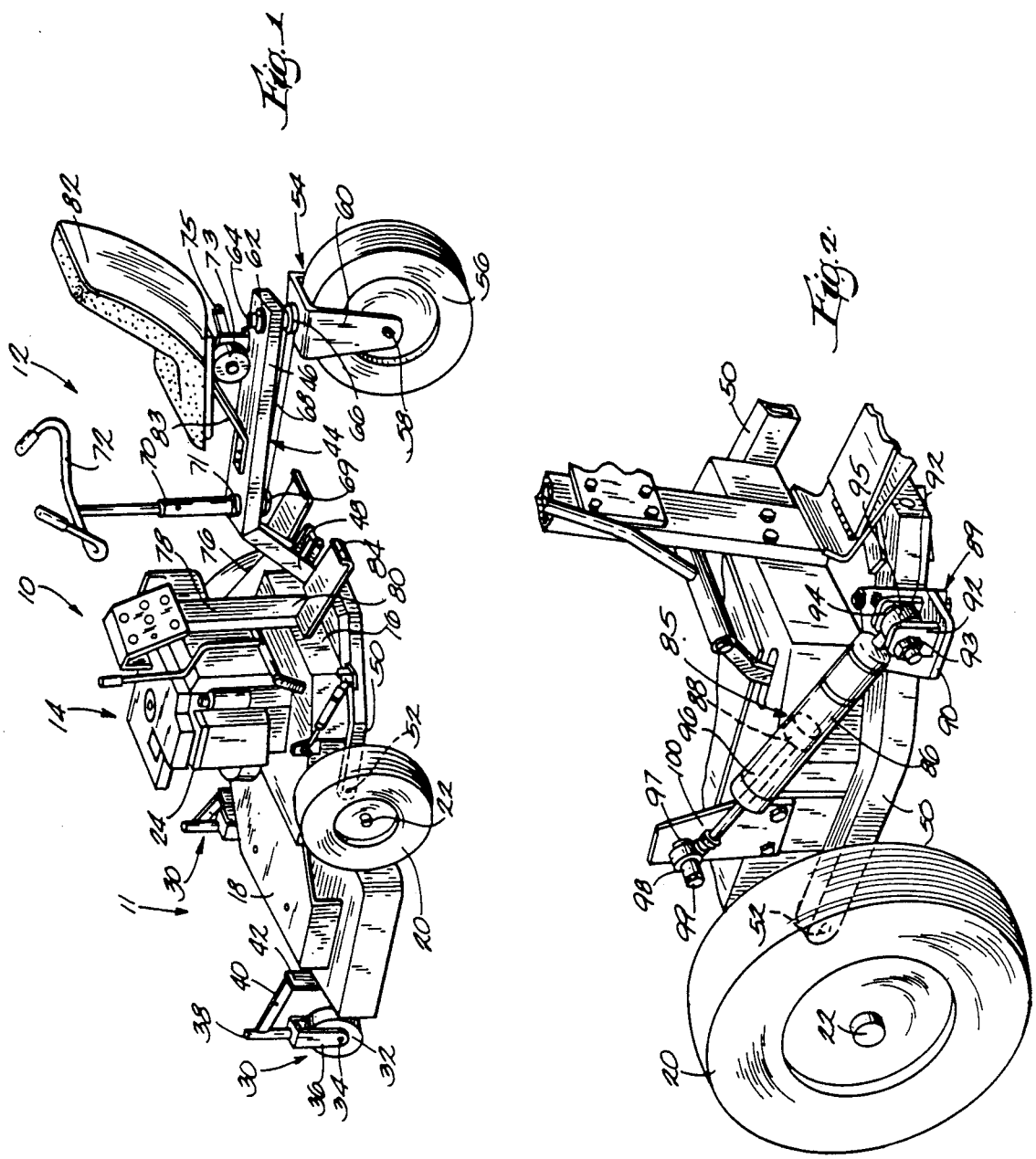

LAWN MOWER

BACKGROUND OF THE INVENTION

This invention relates to lawn mowers and more particularly to mowers of the type which include a riding frame pivotally connected to a mower assembly.

One type of lawn mower employed for cutting larger areas comprises a motor and drive assembly which is integral with the cutting assembly. A riding sulky is pivotally connected to the mower assembly for supporting the operator and includes a steering assembly and various controls.

Normally, it is desirable for commercial lawn cutters to mow grass as rapidly as possible because operating time relates directly to labor cost and, hence, profitability. With conventional lawn mowers, a quality cut could be achieved only at speeds of four to five miles per hour if the turf is relatively smooth and less if the ground is hard and rough. In addition, at higher speeds, seat bounce tends to cause operator fatigue and back soreness.

SUMMARY OF THE INVENTION

It is the object of the invention to provide a new and improved lawn mower.

A further object of the invention is to provide a riding lawn mower which provides an even cut while operated at high speeds.

Another object of the invention is to provide a riding lawn mower which reduces operator fatigue and discomfort.

These and other objects and advantages of the present invention will become more apparent from the detailed description thereof taken with the accompanying drawings.

In general terms, the invention comprises a lawn mower having a riding unit and a power and cutting unit. First wheel means is mounted for rotation on the power and cutting unit. The riding unit includes a frame pivotally coupled to the power and cutting unit and second wheel means is rotatably mounted on the frame. The power and cutting unit also includes a cutting assembly and a drive assembly having an engine coupled to the cutting assembly. Shock absorber means is coupled at one end to said frame means and at its other end to said power and cutting unit for damping relative pivotal movement therebetween.

BRIEF DESCRIPTION OF THE DRAWINGS

FIG. 1 is a perspective view of the lawn mower in accordance with a preferred embodiment of the invention; and FIG. 2 is an enlarged perspective view of a portion of the lawn mower in accordance with the invention.

DETAILED DESCRIPTION OF THE PREFERRED EMBODIMENT

The lawn mower 10 according to the preferred embodiment of the invention is shown in FIG. 1 to include a drive and cutter unit 11 and a riding unit 12. The drive and cutter unit 11 includes an engine assembly 14 mounted on an engine deck 16 and a cutter assembly (not shown) which is housed below a mower deck 18. The engine deck 16 and the mower deck 18 are rigidly secured in any suitable manner.

A pair of drive wheels 20, only one of which can be seen in FIGS. 1 and 2, are fixed to shafts 22 which are journalled for rotation in bearings (not shown) which are mounted on the engine deck 16. As those skilled in the art will appreciate, the engine assembly is suitably coupled to the shafts 22 by means of a transmission or the like, whereby the wheels 20 may be driven in a forward or reverse direction. Similarly, the engine assembly 14 is suitable connected for rotating the cutter assembly disposed below mower deck 18.

The engine assembly 14 includes a conventional gasoline engine 24 and a transmission (not shown), both of which are mounted on the engine deck 16. The front end of the drive and cutter 11 may be supported on a pair of spaced-apart casters 30, each of which includes a caster wheel 32 rotatably mounted on a shaft 34 extending between the arms of a yoke 36. A second shaft extends upwardly from the yoke 36 and is rotatably received in a vertical bearing 38 carried at the end of an arm 40 extending upwardly and forwardly from a vertical bracket 42 mounted at the front of deck 18.

The riding unit 12 includes a frame 44 fabricated of channel or box sections and having a horizontal first portion 46, a mid-portion 48 which slopes downwardly and forwardly from the first potion to a pair of fork arms 50 which project outwardly and forwardly around the engine deck 16. The forward ends of the fork arms 50 are pivotally connected to the engine deck 16 by pivot pins 52 which are located just to the rear of the drive shafts 22.

A steering wheel assembly 54 is mounted below the rear end of the first frame portion 46 and includes a relatively large wheel 56 rotatably mounted on a shaft 58 extending between the arms of a downwardly extending yoke 60. A bearing 62 is mounted on the frame portion 46 for receiving a shaft 64 extending upwardly from and fixed to the yoke 60.

Steering is accomplished by means of a sheave 66 above the yoke 60 and which is coupled by a cable 68 to a sheave 69 mounted at the lower end of a steering post 70 rotatably mounted in a bearing 71 located at the forward end of frame portion 46. A pair of handlebars 72 are mounted at the upper end of post 70. It will be appreciated that when the handlebars 72 are pivoted to rotate the post 70, one leg of the cable 68 will shorten thereby causing the wheel 56 to pivot within the bearing 62.

A winch assembly is provided for elevating the forward end of the mower assembly for servicing and maintenance and includes a winch 73 rotatably mounted about a horizontal axis intermediate the ends of frame portion 46 and having a handle 75 to permit manual operation. In addition, a sheave (not shown) is mounted on the frame section 48 just above its junction with the fork members 50. A cable 76 extends from the winch 73 downwardly around the sheave (not shown) and then upwardly to a lug 78 which is affixed to the instrument panel frame 80 which extends rigidly upwardly from the back of the engine deck 16. The winch 73, the sheave 75 and the lug 78 are so located that the cable portion between the sheave 75 and the lug 78 is oriented at an angle of approximately ninety degrees from a radial line extending from the axis of shafts 22.

A seat 82 is also mounted on the frame 46 by means of a spring member 83. In addition, a pair of footrests 84 are mounted adjacent the rear of the engine deck.

The relatively heavy components such as the engine deck 16, the engine 24, and the transmission are preferably positioned such that their combined center of gravity is rearward of the drive wheel axis. As a result, they act to counterbalance the weight of the cutter assembly 17 and the deck 18 without the use of auxiliary devices such as springs. Further, the arrangement and weight distribution and low center of gravity of the various components and the tread distance between the main drive wheels permits safe operation on slopes of as much as 25-30 degrees without the danger of tipping over at any angle of travel. The illustrated steering assembly permits a relatively small steering radius so that the inside drive wheel will either be stopped or actually rotate in a reverse direction from the outside drive wheel without the use of independent wheel drives. By connecting the frame 44 to the drive and cutter assembly 11 at a point close to the axis of the drive shaft 22, the assembly is relatively stable in reverse and tight turns.

At least one shock absorber assembly 85 is pivotally mounted at its opposite ends on the riding frame 44 and the engine deck 16. In the preferred embodiment, the shock absorber assembly includes a sealed cylinder 86 which contains a piston 88. The opposite ends of the cylinder contain a gas, such as nitrogen, under pressure. In the illustrated embodiment, the pressure in the opposite ends of the cylinder is equal, although it may be unequal, depending upon the configuration of the components of the lawn mower 10. While only a single shock absorber assembly 85 is illustrated, it will be appreciated that more than one may also be employed without deviating from the invention. For example, a second assembly 85 could be mounted on the opposite side of the mower 10.

The end of the cylinder is pivotally connected to one of the fork arms 50 by means of a bracket 89 having a base 90 and a pair of upwardly extending bracket members 92. A bolt 93 extends through aligned openings in bracket members 92 for supporting a cylindrical pivot member 94 between bracket members 92. An eye connector 95 is fixed to the end of the cylinder 86 and receives the pivot member 94 through a central opening. A piston rod 96 extends from piston 88 and through a sealed opening in the other end of cylinder 86. At the end of piston rod 96 there is an eye connector 97 which engages a second cylindrical pivot member 98 mounted by means of a bolt 99 to a support bracket 100 fixed to engine deck 16. Pivot member 98 extends in general parallelism to pivot member 94 and is received within eye connector 97.

As the mower moves over uneven ground, the tendency for the mower assembly 11 and the riding assembly 44 to bounce one relative to the other is dampened by the shock absorber assembly 85. This permits the operator to mow over rough ground at a substantially higher speed which approaches two times normal. In addition, there is less operator fatigue and back soreness.

While only a single embodiment of the invention has been illustrated and described, it is not intended to be limited thereby, but only by the scope of the appended claims.

I claim:

1. A lawn mower comprising a riding unit and a power and cutting unit, first wheel means mounted for rotation on the power and cutting unit, said riding unit including frame means pivotally coupled to said power and cutting unit, second wheel means rotatably mounted on said frame means, said power and cutting unit including a cutting assembly and a drive assembly having an engine coupled to said cutting assembly and to said first wheel means for driving the lawn mower and for rotating the cutting assembly, shock absorber means coupled at one end to said frame means and at its other end to said power and cutting unit for damping relative pivotal movement therebetween thereby minimizing relative bouncing of said riding unit and said power and cutting unit which normally occurs as said mower moves over uneven terrain so that an acceptable cut can be obtained at cutting speeds in excess of that possible without said shock absorber means.

2. The lawn mower set forth in claim 1 wherein said shock absorber means includes cylinder means and piston means having a piston rod extending therefrom, said cylinder means being pivotally connected to one of said units and said Piston rod being pivotally connected to the other of said units.

3. The lawn mower set forth in claim 2 wherein said first wheel means comprises drive wheels mounted for rotation on the power and cutting unit, said second wheel means being mounted below said frame means and displaced rearwardly of said drive wheels, and means for manually turning said second wheel means for steering said lawn mower.

4. The lawn mower set forth in claim 2 wherein compressed gas is disposed in said cylinder on the opposite sides of said piston wherein said shock absorber means will dampen relative pivotal movement of said units in both directions about their pivotal axis.

5. The lawn mower set forth in claim 4 wherein said frame means includes a pair of forwardly extending arms, said arms being pivotally coupled to said power and cutting unit, said shock absorber means being coupled to one of said arms.

6. A lawn mower comprising a riding unit and a power and cutting unit, first wheel means mounted for rotation on the power and cutting unit, said riding unit including frame means pivotally coupled to said power and cutting unit, second wheel means rotatably mounted on said frame means, said power and cutting unit including a cutting assembly and a drive assembly having an engine coupled to said cutting assembly, said engine also being coupled to said first wheel means for driving said mower, said riding unit and said power and cutting unit tending to bounce relative to each other as said mower moves over rough terrain, and dampening means coupled to said frame means and to said power and cutting unit for damping relative pivotal movement of said units relative to each other.

7. The lawn mower set forth in claim 6 wherein said dampening means includes at least one shock absorber means pivotally connected at one end to said power and cutting unit and at its other end to said frame means.

8. The lawn mower set forth in claim 7 wherein said shock absorber means includes cylinder means and piston means having a piston rod extending therefrom, said cylinder means being pivotally connected to one of said units and said Piston rod being pivotally connected to the other of said units.

9. The lawn mower set forth in claim 8 wherein compressed gas is disposed in said cylinder and on the opposite sides of said piston wherein said shock absorber means will dampen relative pivotal movement of said units in both directions about their pivotal axis.

10. The lawn mower set forth in claim 9 wherein said frame means includes a pair of forwardly extending arms, said arms being pivotally coupled to the power and cutting unit, said shock absorber means being coupled to at least one of said arms.

11. The lawn mower set forth in claim 10 wherein said first wheel means comprises drive wheels rotatably mounted on said power and cutting unit, said second wheel means being mounted below said riding frame and displaced rearwardly of said drive wheels, and means for manually turning said second wheel means for steering said lawn mower.

12. A lawn mower comprising a riding unit and a power and cutting unit, first wheel means mounted for rotation on the power and cutting unit, said riding unit including frame means coupled to said power and cutting unit for pivotal movement about a pivot axis, second wheel means rotatably mounted on said frame means, said power and cutting unit including a cutting assembly and a drive assembly having engine means coupled to the cutting assembly, said engine means also being coupled to said first wheel means for driving said mower in a first direction generally perpendicular to the pivot axis as said mower is displaced, and shock absorbing means coupled at one end to said frame means and at its other end to said power and cutting unit, said shock absorbing means having a line of action which intersects a plane containing the direction of movement of the mower and said pivot axis, said dampening means being operative to dampen relative pivotal movement of said power and cutting unit relative to said riding unit whereby the tendency of said cutting unit to bounce is reduced so that an acceptable cut can be obtained at cutting speeds in excess of those possible without said shock absorbing means.

13. The lawn mower set forth in claim 12 wherein said shock absorbing means is pivotally connected at one end to said power and cutting end and at its other end to said frame means.

14. The lawn mower set forth in claim 13 wherein said shock absorbing means includes cylinder means and piston means having a piston rod extending from said cylinder means, said cylinder means being pivotally connected to one of said units and said piston rod being pivotally connected to the other of said units.

15. The lawn mower set forth in claim 14 wherein compressed gas is disposed in said cylinder and on the opposite sides of said piston wherein said shock absorber means will dampen relative pivotal movement of said power and cutting unit and said riding unit about said axis.

* * * * *